(12) United States Patent
Chen et al.

(10) Patent No.: US 6,912,122 B2
(45) Date of Patent: Jun. 28, 2005

(54) ROTATABLE DISPLAY FIXING MODULE

(75) Inventors: Wen-Hsiang Chen, Taipei Shien (TW); Kuo-Chang Yang, Hsinchu (TW); Jung-Wen Chang, Taoyuan Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 122 days.

(21) Appl. No.: 10/446,092

(22) Filed: May 28, 2003

(65) Prior Publication Data

US 2004/0141284 A1 Jul. 22, 2004

(30) Foreign Application Priority Data

Jan. 16, 2003 (TW) ...................................... 92200814 U

(51) Int. Cl.⁷ ............................................... G06F 1/16
(52) U.S. Cl. ...................... 361/681; 361/683; 345/168; 248/917
(58) Field of Search ................................ 361/681, 679, 361/682, 683, 724–727; 345/156, 168, 169, 905; 248/917–918, 919–924; 312/208.1, 208.4; 349/58, 60; 16/366, 367, 368, 392; 74/490.05, 490.06; 400/489, 682, 691–693; 403/119–121, 146, 83, 84, 95, 103; 292/42, 145

(56) References Cited

U.S. PATENT DOCUMENTS

| | | | | |
|---|---|---|---|---|
| 5,016,849 A | * | 5/1991 | Wu ........................... | 248/176.3 |
| 5,168,423 A | * | 12/1992 | Ohgami et al. ............. | 361/681 |
| 5,335,142 A | * | 8/1994 | Anderson .................... | 361/681 |
| 5,873,554 A | * | 2/1999 | Nobuchi ................... | 248/278.1 |
| 6,065,732 A | * | 5/2000 | Cho ........................... | 248/371 |
| 6,275,376 B1 | * | 8/2001 | Moon ......................... | 361/683 |
| 6,347,433 B1 | * | 2/2002 | Novin et al. .................. | 16/367 |
| 6,587,333 B2 | * | 7/2003 | Tseng et al. ................ | 361/681 |
| 6,654,233 B2 | * | 11/2003 | Tseng et al. ................ | 361/681 |
| 6,694,570 B2 | * | 2/2004 | Chen .......................... | 16/367 |
| 6,742,221 B2 | * | 6/2004 | Lu et al. ....................... | 16/367 |
| 6,798,646 B2 | * | 9/2004 | Hsu ........................... | 361/681 |
| 6,804,861 B2 | * | 10/2004 | Hsu ............................. | 16/366 |
| 6,850,407 B2 | * | 2/2005 | Tanimoto et al. ........... | 361/681 |
| 2003/0052857 A1 | * | 3/2003 | Pappas ...................... | 345/156 |
| 2003/0193773 A1 | * | 10/2003 | Choi .......................... | 361/683 |

* cited by examiner

Primary Examiner—Michael Datskovskiy
(74) Attorney, Agent, or Firm—Rabin & Berdo, P.C.

(57) ABSTRACT

A rotatable display fixing module is described. The rotatable display fixing module has a first rotational device, a second rotational device, a fixing switch and an auxiliary fixing stud. The first rotational device rotatably connects with a display and the second rotational device. The fixing switch and the auxiliary fixing stud rebound up to fix the second rotational device at predetermined angles and the auxiliary fixing stud passes through a fixing hole on a rotational element of the second rotational device. The display can therefore rotate on the first rotational device only. When the fixing switch and the auxiliary fixing stud are pressed, the display can rotate on the first rotational device and the second rotational device.

20 Claims, 3 Drawing Sheets

ROTATABLE DISPLAY FIXING MODULE

FIELD OF THE INVENTION

The present invention relates to a rotatable display fixing module and especially to a rotatable display fixing module for notebook computer.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and are gradually replacing the cathode ray tubes (CRT) used in conventional displays. LCDs are becoming the mainstream display apparatus.

A conventional display of a notebook computer is disposed in the upper cover of the notebook computer. The display demonstrates information and images thereon when the upper cover of the notebook computer is opened. The upper cover and a base of the notebook computer connect to each other with a pivot. Therefore, the working angle of the display can be adjusted according to user requirements by way of adjusting an angle of the upper cover.

Notebook computers are convenient to carry and therefore are often carried to business meetings. In different environments, the notebook computer has to provide different display angles to enhance demonstration capabilities thereof. However, due to a conventional restricted display angle, the notebook computer cannot provide all viewers with clear images on the display. Moreover, due to software and hardware improvements, a tablet personal computer (Tablet PC) combines the notebook computer with a hand writing input device on the display. The tablet PC changes the input habits of the computer user and advances the information industry to a new milestone. A dual-purpose tablet PC with high processing performance combines the hand writing input device on the display panel and the keyboard input of the notebook computer. The dual-purpose tablet PC provides a humanizing input interface for a user who usually works in a moving environment. The display of a dual-purpose tablet PC can rotate about 180 degrees so that viewers around the tablet PC can more easily see the information and images on the display than before.

Because the display is able to rotate, not fixed, the display may shake when the tablet PC is working so that the display is in an unstable working situation. Furthermore, because the rotatable display is usually rotated around a rotating mechanism, there is a concave hole around the rotating mechanism to provide room for the rotating mechanism to move. Therefore, the user directly sees the concave hole under the rotatable display when the display of the dual-purpose tablet PC is opened. The concave hole may induce an unattractive appearance and further allows foreign objects to drop into the concave hole to interfere with the rotation of the rotating mechanism and even to damage the rotating mechanism.

Therefore, there is a need to fix effectively the display on the dual-purpose tablet PC and beautify the concave hole to provide an attractive appearance and a more stable working situation.

SUMMARY OF THE INVENTION

It is an object of the present invention to provide a fixing switch to fix the display after the display reaches a predetermined angle so as to reduce the shaking phenomenon when the display is in use.

It is another object of the present invention to provide an auxiliary fixing stud to further secure the rotatable display fixing module when the display reaches the predetermined angle so as to stabilize the working display.

It is further another object of the present invention to provide a fixing switch that automatically rebounds to cover the concave hole around the rotating mechanism to prevent foreign objects from dropping thereinto when the display reaches the predetermined angle.

To accomplish the above objectives, the present invention provides a rotatable display fixing module. The rotatable display fixing module includes a first rotational device, a second rotational device, a fixing switch, and an auxiliary stud. The first rotational device rotatably connects a display, such as a liquid crystal display of a notebook computer, to the second rotational device. The first rotational device is capable of rotating on the second rotational device. Therefore, the display is capable of rotating on both the first rotational device and the second rotational device. The fixing switch further includes a fixing surface. If the fixing switch rebounds to a rebound position, the fixing surface of the fixing switch fixes a rotation element of the second rotational device at a predetermined angle and the display is still capable of rotating on the first rotational device. The auxiliary stud rebounds together with the fixing switch and passes through a fixing hole on the rotational element of the second rotational device for enhancing the fixing capability of the second rotational fixing device.

The auxiliary fixing stud further comprises a spring element to rebound the fixing switch and the auxiliary fixing stud at the predetermined angle, such as when the second rotational device is at 0 or 180 degrees. The auxiliary fixing stud is pressed down when the fixing switch is pressed down so that the auxiliary fixing stud separates from the fixing hole. Therefore, the display is capable of rotating on the first rotational device and the second rotational device when the fixing switch is pressed down.

Hence, when the fixing switch rebounds up, the rotatable display fixing module according to the present invention locks the display to avoid turning left and right so that the shaking problem can be eliminated and the appearance thereof is more attractive. Furthermore, the fixing switch can cover the concave hole to prevent foreign objects from dropping into the concave hole so as to protect the rotating mechanism from damage. The display can easily rotate on the first and second rotational device when the fixing switch is pressed down and together with the auxiliary stud.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
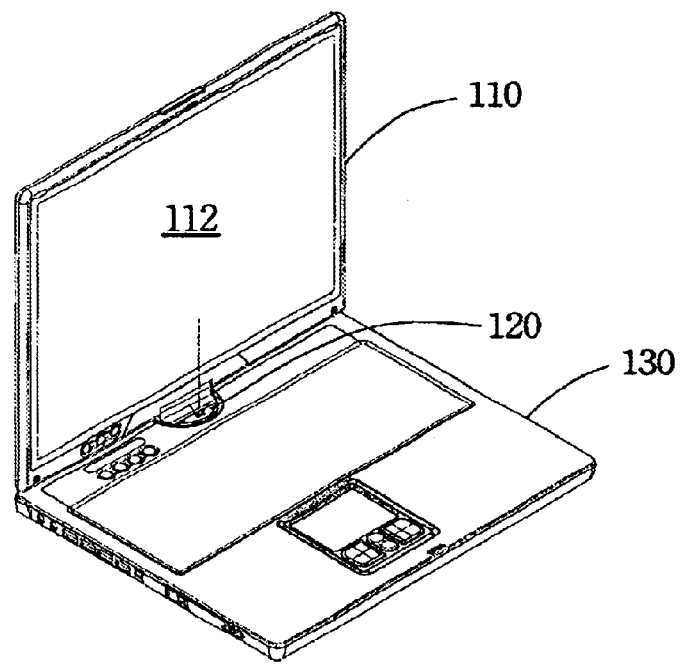
FIG. 1A is a schematic perspective view of a notebook computer having an opened display with a rotatable display fixing module of a preferred embodiment according to the present invention.
Figure 1B:
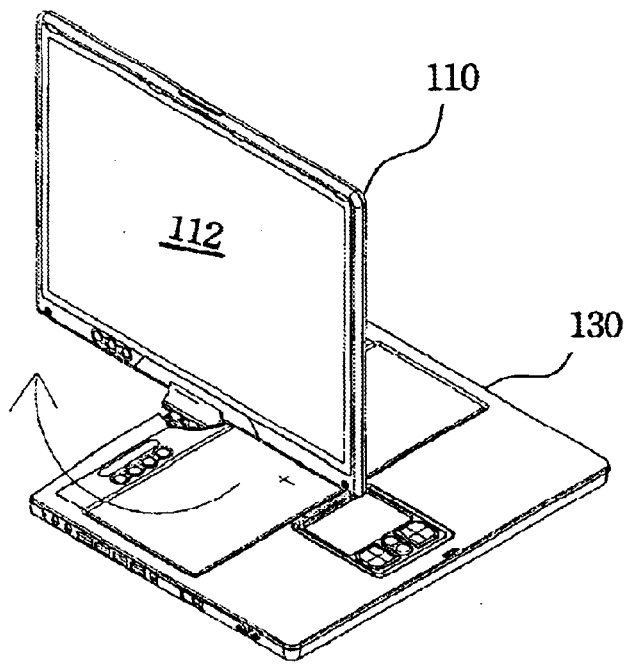
FIG. 1B is a schematic perspective view of the notebook computer having a rotating 90 degrees display of FIG. 1A.
Figure 1C:
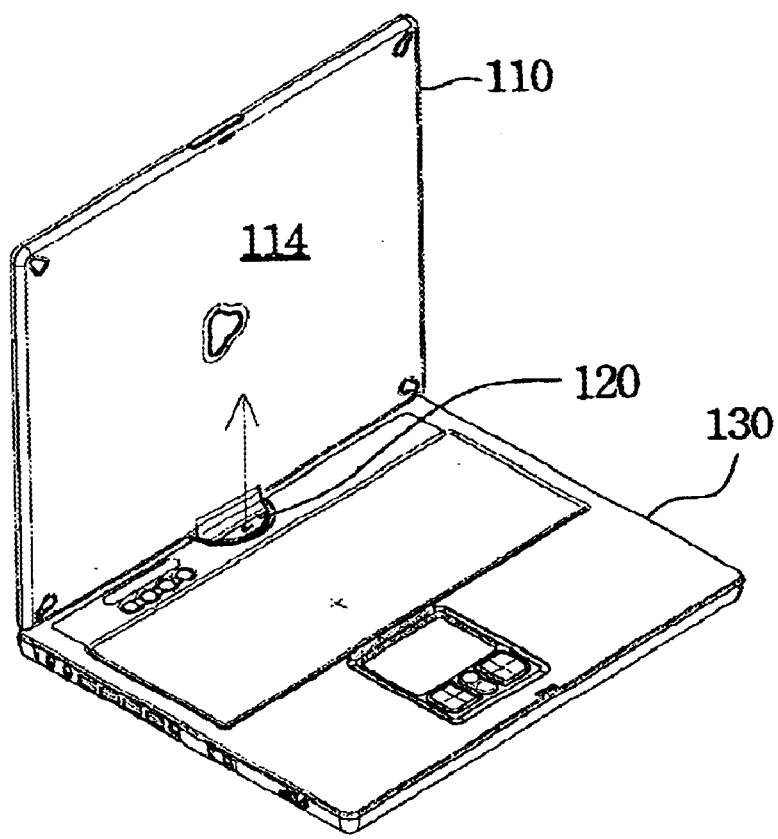
FIG. 1C is a schematic perspective view of the notebook computer having a rotating 180 degrees display of FIG. 1A.

FIG. 1A to FIG. 1C illustrate a display with a rotatable display fixing module of a preferred embodiment according to the present invention. FIG. 1A illustrates the display as being just opened from a base of a notebook computer. FIG. 1B illustrates the display rotated about 90 degrees from the original position. FIG. 1C illustrates the display rotated about 180 degrees from the original position. Referring to FIGS. 1A to 1C, the notebook computer includes a display 110, a rotatable display fixing module 120, and a base 130. The display 10 further includes a display panel 112 on the front side of the display 110 and a display back cover 114 on the rear side thereof. The display 110 can be directly opened and the working angle thereof adjusted, similar to a conventional display of a notebook computer.

In FIG. 1B, the display 110 is rotated 90 degrees from the original position, and therefore the display panel 112 faces to the left (or right) of the drawing. In FIG. 1C, the display 110 is further rotated 90 degrees again and therefore the display panel 112 faces the backside of the notebook computer and the display back cover 114 faces the inner side of the notebook computer. Hence, the notebook computer with the rotatable display fixing module 120 can provide viewers standing on the rear side of the notebook computer with a clear view of the information and images on the display panel 112 while a user uses a mouse and a keyboard to operate the notebook computer.

The display 110 can open up and down and further rotate 180 degrees clockwise or counterclockwise; that is to say, the display 110 turns right or left 180 degrees. Therefore, after the display 110 rotates 180 degrees, the display 110 can also be closed on the base 130, and then the notebook computer becomes a tablet PC.

Figure 2:
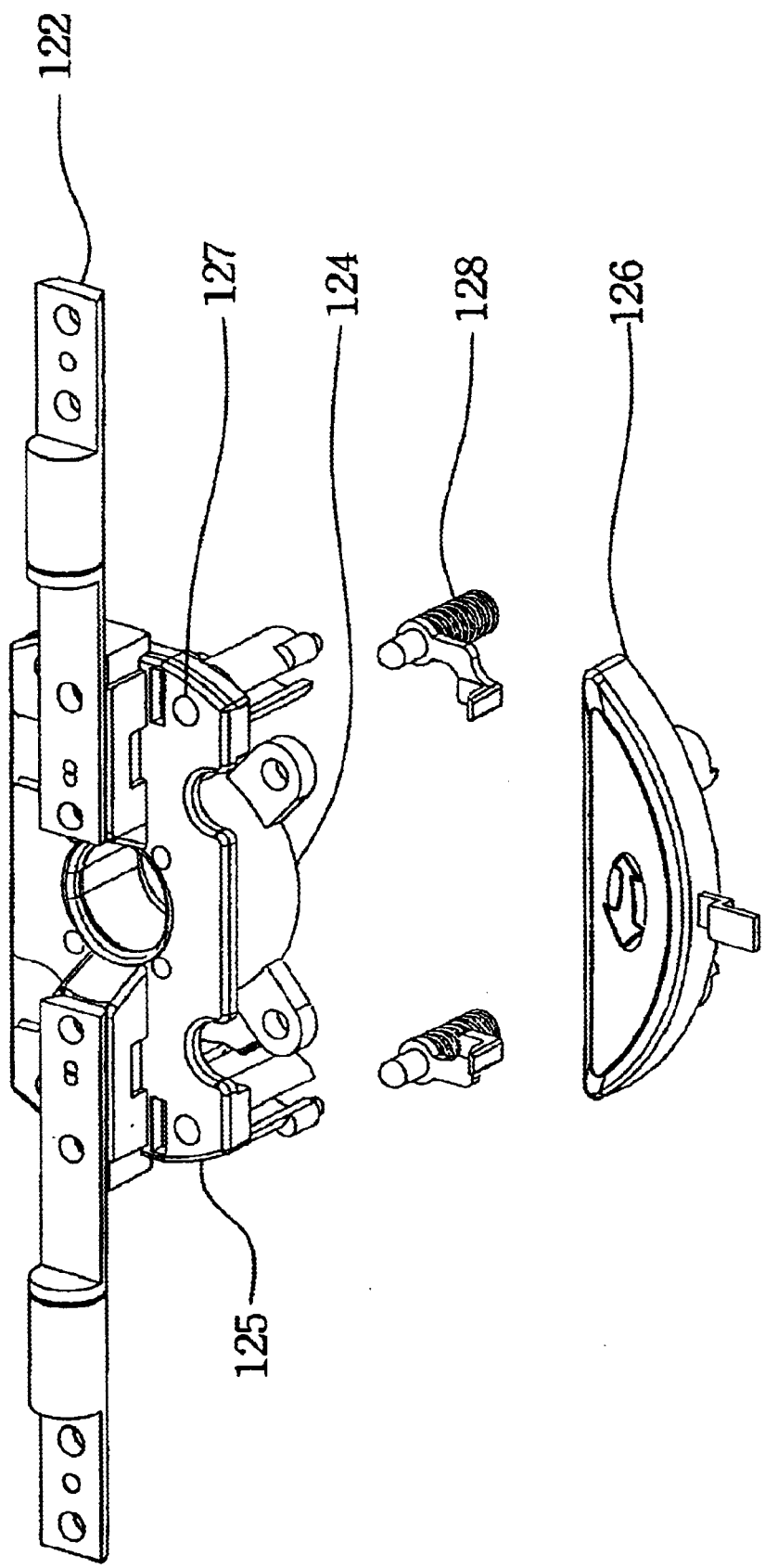
FIG. 2 is a detail exploded view of the rotatable display fixing module according to the present invention.

FIG. 2 is a detail exploded view of the rotatable display fixing module according to the present invention. The detail operation procedure of the rotatable display fixing module 120 according to the present invention is illustrated with reference to FIG. 2. The rotatable display fixing module 120 includes a first rotational device 122, a second rotational device 124, a fixing switch 126, at least one fixing hole 127 and at least one auxiliary fixing stud 128. The first rotational device 122 connects to the display 110 and therefore the display 110 can rotate up-down by way of the first rotational device 122. The second rotational device 124 further rotatably couples with the first rotational device 122 and therefore the first rotational device 122 can rotate with the second rotational device 124 in a clockwise or counterclockwise direction; that is to say, the first rotational device 122 can turn right or left by way of the second rotational device 124.

Hence, the rotatable display fixing module according to the present invention can enable the notebook computer rotating up-down and left-right. For eliminating the display shaking problem when the notebook is working, the rotatable display fixing module 120 according to the present invention further utilizes a fixing surface on the fixing switch 126 and the auxiliary fixing studs 128 to fix the second rotational device 124.

Referring to FIG. 1A again, the fixing switch 126 contacts and fixes a rotational element 125 (referring to FIG. 2) of the second rotational device 124 when the fixing switch 126 is at a rebound position, such as when the display 110 is at 0 degrees and the fixing switch 126 rebounds to the rebound position. Therefore, the fixing switch 126 fixes the rotational element 125 of the second rotational device 124 at 0 degrees to effectively eliminate the shaking problem of the display 110. At the same time, the auxiliary studs 128 rebounds up together with the fixing switch 126. The auxiliary studs 128 passes through fixing holes 127 on the rotational element 125 of the second rotational device 124. Therefore, the second rotational device 124 is fixed by the fixing switch 126 and the auxiliary fixing studs 128 so that the display 110 can work stably.

Referring to FIG. 1C again, the fixing switch 126 contacts and fixes the rotational element of the second rotational device 124 when the fixing switch 126 is also at the rebound position, such as when the display 110 is at 180 degrees. Therefore, the fixing switch 126 and the auxiliary studs 128 fix the rotational element of the second rotational device 124 at 180 degrees to effectively eliminate the shaking problem of the display 110.

The user only needs to press the fixing switch 126 into the concave hole on the base 130 when the user wants to rotate the display 110. When the fixing switch 126 is in a lower position, the display 110 can easily rotate in both clockwise and counterclockwise directions.

When the display 110 arrives at 0 or 180 degrees, the fixing switch 126 and the auxiliary fixing studs 128 rebound to the rebound position via a spring force, by, for example, spring elements on the auxiliary studs 128. Therefore, once more, the fixing switch 126 contacts the second rotational device 124 and the auxiliary fixing studs 128 pass through the fixing holes 127 so that the display 110 cannot rotate left or right. Hence, the display 110 can be more stably secured and the shaking problem thereof can be eliminated when the notebook computer is in use.

A conventional dual-purpose tablet PC provides a display with clockwise and counterclockwise rotation and the base thereof usually must include a concave hole for the rotating mechanism. But the concave hole can induce an unattractive appearance and the rotating mechanism can be damaged by foreign objects dropped into the concave hole. The rotatable display fixing module according to the present invention provides the fixing switch and the auxiliary studs with rebounding ability to fix the display and further, the fixing switch can cover the concave hole to protect the concave hole from the foreign objects at the rebound position. Accordingly, the present invention further provides an attractive appearance for the dual-purpose tablet PC. The present invention can be used not only in a notebook computer but also use in any electric appliance with a flat display.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A rotatable display fixing module for connecting a base and a display module of a notebook computer, the rotatable display fixing module comprising:

a first rotational device rotatably connecting with the display so as to allow the display rotating on the first rotational device;

a second rotational device rotatably connecting with the first rotational device so as to allow the first rotational device rotating clockwise or counter-clockwise with a rotational element of the second rotational device and the display a capability of rotating on the first rotational device and the second rotational device; and a fixing switch connecting with the base, said fixing switch having a fixing surface, wherein when the fixing switch rebounds, the fixing surface fixes the second rotational device at a predetermined angle and the display is still capable of rotating up and down on the first rotational device.

2. The rotatable display fixing module of claim 1, wherein the display comprises a liquid crystal display.

3. The rotatable display fixing module of claim 1, further comprising an auxiliary stud coupling with the fixing switch to rebound together with the fixing switch and pass through a fixing hole in the second rotational device.

4. The rotatable display fixing module of claim 3, wherein the auxiliary fixing stud further comprises a spring element to rebound the fixing switch and the auxiliary fixing stud at the predetermined angle.

5. The rotatable display fixing module of claim 1, wherein the predetermined angle is 0 degrees.

6. The rotatable display fixing module of claim 1, wherein the predetermined angle is 180 degrees.

7. The rotatable display fixing module of claim 1, wherein the auxiliary fixing stud is pressed down when the fixing switch is pressed down so that the auxiliary fixing stud separates from the fixing hole.

8. The rotatable display fixing module of claim 7, wherein the display is capable of rotating with the first rotational device and the second rotational device when the fixing switch is pressed down.

9. A rotatable display fixing module for connecting a base and a display module of a notebook computer, the rotatable display fixing module comprising:

a first rotational device rotatably connecting to a liquid crystal display of the notebook computer so as to allow the liquid crystal display rotating with the first rotational device;

a second rotational device rotatably connecting with the first rotational device so as to allow the first rotational device rotating with a rotational element of the second rotational device, and the liquid crystal display rotating with the first rotational device and the second rotational device;

a fixing switch connecting with the base having a fixing surface, wherein when the fixing switch rebounds, the fixing surface fixes the second rotational device at a predetermined angle and the liquid crystal display is still capable of rotating on the first rotational device; and an auxiliary stud coupling with the fixing switch to rebound together with the fixing switch and pass through a fixing hole in the second rotational device.

10. The rotatable display fixing module of claim 9, wherein the auxiliary fixing stud further comprises a spring element to rebound the fixing switch and the auxiliary fixing stud at the predetermined angle.

11. The rotatable display fixing module of claim 9, wherein the predetermined angle is 0 degrees.

12. The rotatable display fixing module of claim 9, wherein the predetermined angle is 180 degrees.

13. The rotatable display fixing module of claim 9, wherein the auxiliary fixing stud is pressed down when the fixing switch is pressed down so that the auxiliary fixing stud separates from the fixing hole.

14. The rotatable display fixing module of claim 13, wherein the display is capable of rotating with the first rotational device and the rotational element of the second rotational device when the fixing switch is pressed down.

15. A notebook computer comprising:

a liquid crystal display;

a base; and a rotatable display fixing module coupling with the liquid crystal display and the base, wherein the rotatable display fixing module further comprises:

a first rotational device rotatably connecting with the liquid crystal display so as to allow the liquid crystal display rotating up and down with the first rotational device;

a second rotational device rotatably connecting with the first rotational device so as to allow the first rotational device rotating with a rotational element of the second rotational device, and the liquid crystal display rotating with the first rotational device and the second rotational device; and a fixing switch connecting with the base having a fixing surface, wherein when the fixing switch rebounds, the fixing surface fixes a rotating element of the second rotational device at a predetermined angle and the liquid crystal display is still capable of rotating on the first rotational device.

16. The notebook computer of claim 15, wherein the predetermined angle is 0 degrees.

17. The notebook computer of claim 15, wherein the predetermined angle is 180 degrees.

18. The rotatable display fixing module of claim 15, further comprising an auxiliary stud coupling with the fixing switch to rebound together with the fixing switch and pass through a fixing hole in the second rotational device.

19. The notebook computer of claim 18, wherein the auxiliary fixing stud is pressed down when the fixing switch is pressed down so that the auxiliary fixing stud separates from the fixing hole.

20. The notebook computer of claim 19, wherein the display is capable of rotating with the first rotational device and the second rotational device when the fixing switch is pressed down.

* * * * *